United States Patent [19]

O'Connor

[11] Patent Number: 5,058,337
[45] Date of Patent: Oct. 22, 1991

[54] GROUND ANCHOR

[76] Inventor: Michael P. O'Connor, 9040 Sterling Creek Rd., Jacksonville, Oreg. 97530

[21] Appl. No.: 631,168

[22] Filed: Dec. 20, 1990

Related U.S. Application Data

[63] Continuation-in-part of Ser. No. 523,352, May 14, 1990.

[51] Int. Cl.⁵ .............................................. E02D 5/74
[52] U.S. Cl. ......................................... 52/162; 256/1; 52/155
[58] Field of Search .................... 52/162, 163, 155; 256/1, DIG. 5

[56] References Cited

U.S. PATENT DOCUMENTS

| | | | |
|---|---|---|---|
| 1,153,450 | 9/1915 | Schaff | 52/155 |
| 1,717,557 | 6/1929 | Halgrimson | 52/162 |
| 2,334,989 | 11/1943 | Brickman | 52/162 |
| 2,705,548 | 4/1955 | Lionberger | 52/162 X |
| 2,910,149 | 10/1959 | Lionberger | 52/162 X |

Primary Examiner—Andrew V. Kundrat
Attorney, Agent, or Firm—James D. Givnan, Jr.

[57] ABSTRACT

A post for ground insertion having a plate which swings outwardly from the post upon upward movement of the post to prevent post extraction. An inclined surface of the plate is acted upon by earthen material for plate deployment. A limit stop positions the plate substantially perpendicular to the post. The plate may consist of overlapped plate members to provide a rigid or non-bendable portion. A bendable portion of the plate bends during upward movement of the post during setting of the post. Such bending occurs about perpendicularly oriented axes.

4 Claims, 2 Drawing Sheets

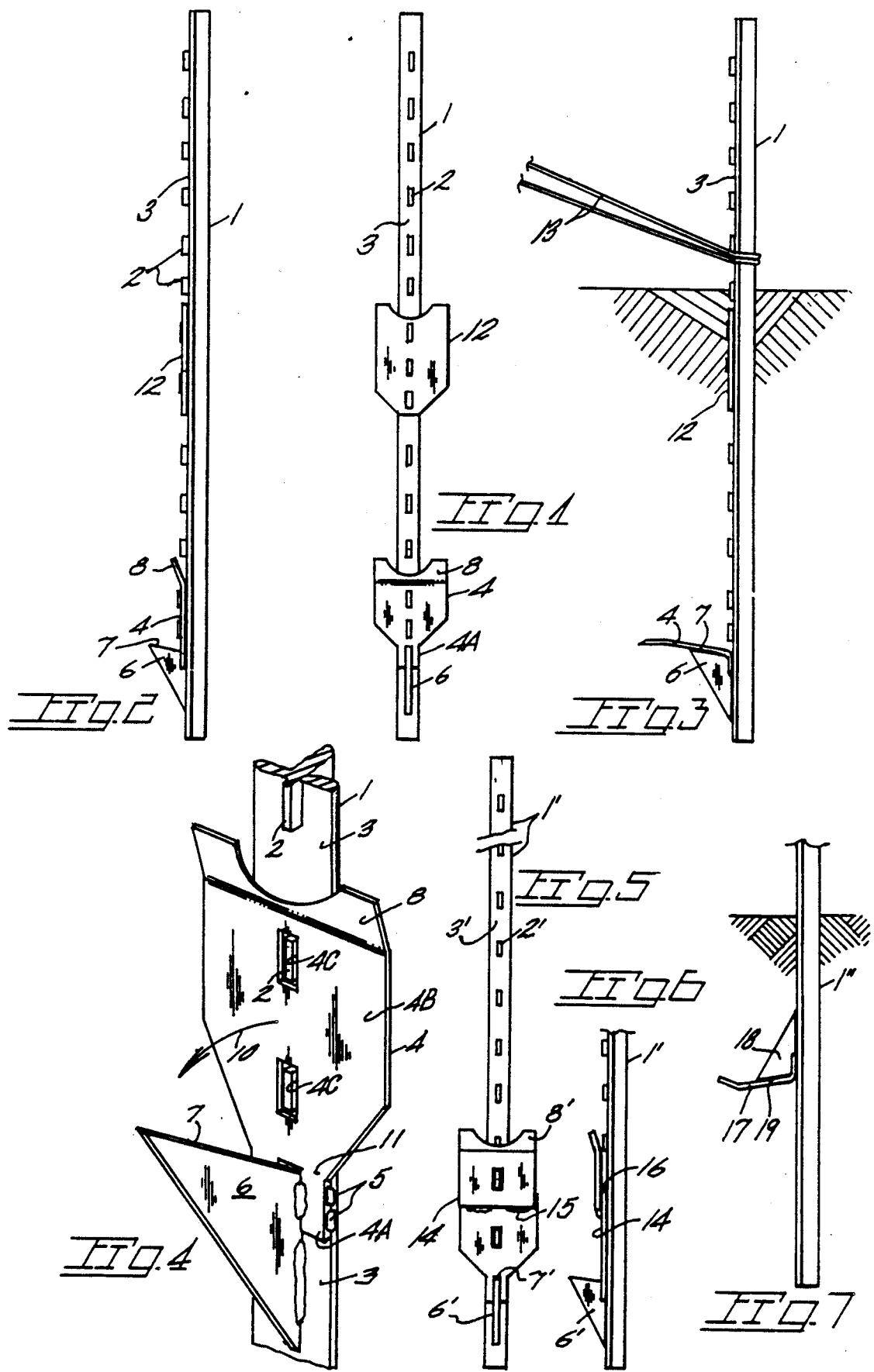

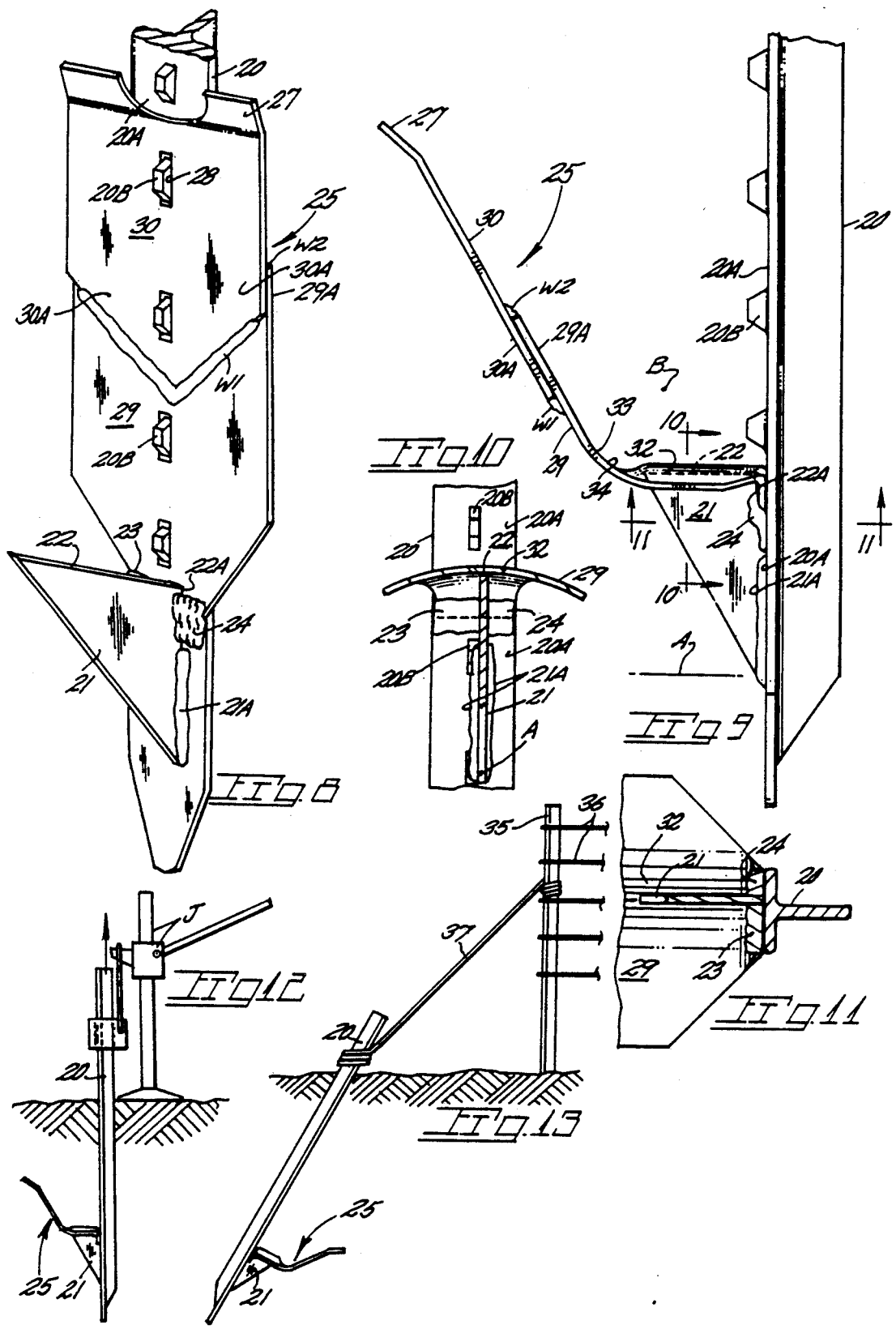

GROUND ANCHOR

BACKGROUND OF THE INVENTION

The present application is a continuation-in-part of my earlier copending application of the same title filed May 14, 1990, under Ser. No. 07/523,352.

The present invention pertains generally to ground engaging articles to which wires, cables, ropes, etc., are attached for support against tension loading.

In the construction of wire trellises used in orchards and vineyards, it is standard practice to transfer wire tension loads to ground inserted articles such as, for example, partially buried posts. As such tension loads may be in the range of several hundred pounds on each wire with two or more wires terminating at a single ground engaging anchor, the pull exerted on the anchor is significant. Breakage of anchors or accidental extraction from the ground is accordingly not unknown.

Posts supporting electric fences include wire arms at their inserted ends which collapse against the post during ground insertion of the post and subsequently deploy perpendicular to the post upon partial post extraction. Such a post is sold by the Kiwi Fence Systems, Inc. under the trademark SPIDER FOOTED POST. Such posts are used on slopes where an upward force is exerted on the post by wire fencing with the wire arms resisting such upward displacement.

SUMMARY OF THE INVENTION

The present invention is embodied in a ground embedded anchor for guy wires and the like with the anchor having a plate positioned into place during installation of the anchor.

A post is provided with a plate which retains an upright position adjacent and parallel the post during post burial but which deploys for surface engagement with the earthen material. To accomplish plate deployment, the post is inserted into the earthen material with limited upward movement of the post causing the plate to engage a limit stop. To facilitate plate positioning, the upper margin of the plate may be somewhat canted away from the post to provide a post appendage which resists passage through the earthen material. A limit stop determines the extent of plate deployment.

An elongate or modified plate is suitable for use in a sandy or water saturated soil. Further, inverted plate and limit stop constitute a modified form of the invention for use in a fence wherein fence wire forces tend to displace fence posts gradually into the ground.

The modified plate has a rigid portion which withstands forces imparted to it during the application of upward force to an embedded ground anchor initially applied during anchor installation. Further, the modified plate has curved portions which merge with one another to provide an area particularly resistant to bending during the application of such a lifting force to the anchor.

Important objectives include the provision of an anchor for guy wires with a plate deployed away from a post member by a lifting action on the anchor with a limit stop limiting plate movement; the provision of a fence post with a plate which limits the extent of post insertion into the ground; the provision of a ground anchor with a plate member which may be modified to suit soil conditions; the provision of a ground anchor particularly suited for securing guy wires which carry tension loads of up to several thousand pounds as, for example, guy wires used to reinforce trellis posts used in orchards and vineyards.

BRIEF DESCRIPTION OF THE DRAWINGS

In the accompanying drawings:

FIG. 1 is a front elevational view of the present ground anchor;

FIG. 2 is a side elevational view taken from the right side of FIG. 1;

FIG. 3 is a side elevational view of the ground anchor operatively disposed;

FIG. 4 is an enlarged, perspective and fragmentary view of a plate, post and limit stop of the present ground anchor;

FIG. 5 is a front elevational view of a modified ground anchor;

FIG. 6 is a fragmentary side elevational view of FIG. 5;

FIG. 7 is a side elevational view of a modified form of the present ground anchor.

FIG. 8 is a perspective view of the lower end of a ground anchor post equipped with a modified plate;

FIG. 9 is a side elevational view of the ground anchor shown in FIG. 8;

FIG. 10 is a vertical sectional view taken along line 10-10 of FIG. 9;

FIG. 11 is a horizontal sectional view taken along line 11-11 of FIG. 9;

FIG. 12 is an elevational view of a ground anchor being installed; and

FIG. 13 is an elevational view of a ground anchor in use anchoring a guy wire for a trellis post.

DETAILED DESCRIPTION OF THE PREFERRED EMBODIMENTS

With continuing attention to the drawings wherein applied reference numerals indicate parts similarly hereinafter identified, the reference numeral 1 indicates a post of the present anchor.

The post may include projections 2 on its face 3 for supporting strands of wire when used as a fence post. Attached to the front face 3 of the post is a place 4 with a tongue or extension 4A in abutment with the post face for securement thereto as by welds at 5. The extension 4A may be bifurcated to straddle a limit stop 6 having a plate engaging, limit stop edge 7 preferably inclined somewhat upwardly and outwardly from post face 3.

An upper margin 8 of the plate is canted away from post face 3. Loads imparted to upper margin 8 during a post installation procedure, as later explained, impart outward movement to the plate in the direction of arrow 10 in FIG. 4. Such movement is permitted by hinge means embodied in the plate bending at 11 of downward extension 4A which is of reduced width to facilitate bending. An outer plate surface 4B contacts a limit stop edge 7 to locate the plate substantially normal to the post for maximum resistance to upward passage through the earthen material. Plate 4 may be apertured at 4C so as to be flush against post surface 3 during ground insertion of the post.

A second plate at 12 may be used on post 1 in instances where there are angularly imparted loads applied to the post, as for example, by inclined guy wires at 13 in FIG. 3. In instances where the forces applied to the post are in alignment with the post, or nearly so, then the second plate at 12 may be dispensed with.

A further modified form of the anchor includes an elongate plate 14 in FIG. 5 which may be formed by the joining or coupling of two plates, as for example, by welds at 15 and 16. Such modified posts are desirable for use in sandy or marsh type soils where added surface area is necessary.

In FIG. 7 I show a modified ground anchor which includes a plate 17 and a limit stop 18 with the plate serving to limit post insertion into the ground by swinging upwardly into engagement with limit stop edge 19. This modification is important when used in light soil conditions where fences traverse the crest of slopes where severe downward forces are applied to posts by the highly tensioned fence material such as trellis wire.

In a further modified form of the present ground anchor shown in FIGS. 8 through 13, a post 20 is equipped with a limit stop 21 secured to the post adjacent the post lower end as by welds as at 21A. Limit stop 21 is shown as being of triangular shape having a limit stop upper edge surface 22 and is notched at 22A to receive the lower end of plate means 25. Welds at 23-24 secure the plate means to a face 20A of the post 20. Limit stop 21 is secured alongside forward projections 20B on the post face.

The plate means, generally at 25, provides a deformable member which, when deployed, virtually prevents post extraction to permit the present post 20 to be used for reinforcing a trellis post at 35 by a guy wire 37 commonly tensioned at several thousands of pounds. Plate means 25 includes a plate 29 with a rigid portion 29A termed non-bendable by reason of being reinforced by a partially overlapping portion 30A of plate 30. The uppermost end 27 of plate means 25 is canted away from post face 20A so as to cause earthen material to impart outward movement to the plate means during lifting of the post during setting of same as later described. Openings at 28 in the plate means permit passage of post projections at 20B when post 20 is so equipped. With posts having a planer front face 20A i.e., devoid of projections, plate opening 28 may be despensed with. The lowermost welds 23-24 jointly extend across post face 20A to provide a smooth, uninterrupted transition surface from post face 20A to the outer surface of plate means 25 to prevent plate and post separation by earthen material during driving of the post. When plate means 25 comprises multiple plates as shown, welds at W1 and W2 join the partially overlapped plate members 29 and 30 which serve to stiffen the plate structure. Stiffening of plate means 25 may be otherwise provided as by, for example, providing a single plate with supplementary material or by shaping of the plate member intermediate its ends during manufacture. A second stiffened area of the plate means 25 is formed during anchor installation where bent portions 32 and 33 are formed during lifting of the anchor or post during installation of same per FIG. 12. The merging or vertex 34 of said bent portions 32-33 provides a plate area particularly resistant to further bending during anchor installation and thereby limits upward travel of post 20 during installation of same. Bent portions 32-33 form about axes A and B.

In installing the present ground anchor, the same is driven into the ground to a depth several inches beyond its permanent depth with lifting of the overdriven post by a jack J for purpose of plate means deployment. The bent portions 32 and 33 of plate means 25 occur about axes lying in planes normal to one another.

In FIG. 13 a trellis post at 35 is supported against trellis imparted loads of trellis wires 36 by a guy wire 37 attached to an anchor post 20 driven and positioned in an inclined relationship to post 35.

I claim:

1. An anchor for ground installation comprising,
   a post for partial burial in earthen material, said post having a frontal face,
   plate means having one end carried by the post for burial, said plate means of non-uniform thickness and having bendable portions and a rigid portion, said rigid portion offset from said one end, a surface inclined to the post axis,
   a limit stop plate secured to said frontal face of the post and having an upper edge for contact with said plate means during upward movement of the post during anchor installation, and
   said surface of the plate means acted upon by the earthen material during upward movement of the post during setting of the post to cause deployment of said rigid portion and bending of the bendable portions resulting in said plate means being deformed into an irregular shape to prevent further upward post movement.

2. The anchor claimed in claim 1 wherein said plate means includes multiple plates, said plates secured to one another in overlapped fashion.

3. The anchor claimed in claim 1 wherein said bendable portions are bendable about axes lying in mutually perpendicular planes.

4. The anchor claimed in claim 3 wherein said bendable portions when bent form contiguous portions providing a vertex to inhibit further bending of said plate means.

* * * * *